(No Model.)

C. B. CORBIN.
COMBINED FISHING ROD AND REEL.

No. 436,302. Patented Sept. 9, 1890.

WITNESSES:

INVENTOR
Charles B. Corbin
BY
Moulton & Rogers
ATTORNEYS

UNITED STATES PATENT OFFICE.

CHARLES B. CORBIN, OF GRAND RAPIDS, MICHIGAN, ASSIGNOR OF ONE-HALF TO FRANK VAN HAFTEN, OF SAME PLACE.

COMBINED FISHING ROD AND REEL.

SPECIFICATION forming part of Letters Patent No. 436,302, dated September 9, 1890.

Application filed June 10, 1890. Serial No. 354,949. (No model.)

*To all whom it may concern:*

Be it known that I, CHARLES B. CORBIN, a citizen of the United States, residing at Grand Rapids, in the county of Kent and State of Michigan, have invented certain new and useful Improvements in a Combined Fishing Pole and Reel; and I do hereby declare the following to be a full, clear, and exact description of the invention, such as will enable others skilled in the art to which it appertains to make and use the same.

My invention relates to combined fish rods and reels in which the line is drawn in by rotating the reel by a reciprocating movement of the lower portion of the rod instead of by a spring or by a cranked reel.

My object is to provide mechanism to rotate the reel by a reciprocating movement of the lower portion of the rod so that the hands of the operator need not leave his rod after a fish is hooked until it is landed, also for disengaging the mechanism for letting the line go free; and my invention consists of the construction, combination, and arrangement of the various parts hereinafter more fully described, and pointed out in the claims, reference being had to the accompanying drawings, wherein—

Figure 1:
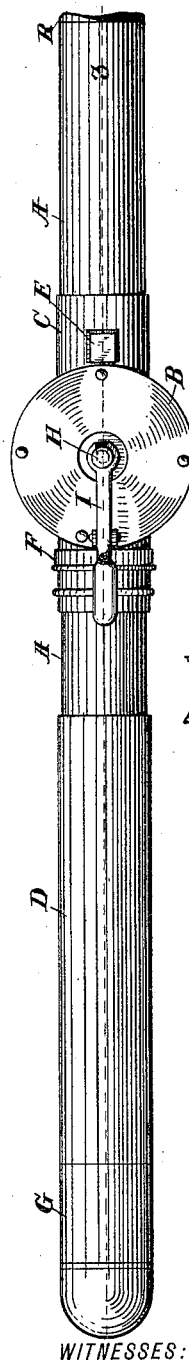
Figure 2:
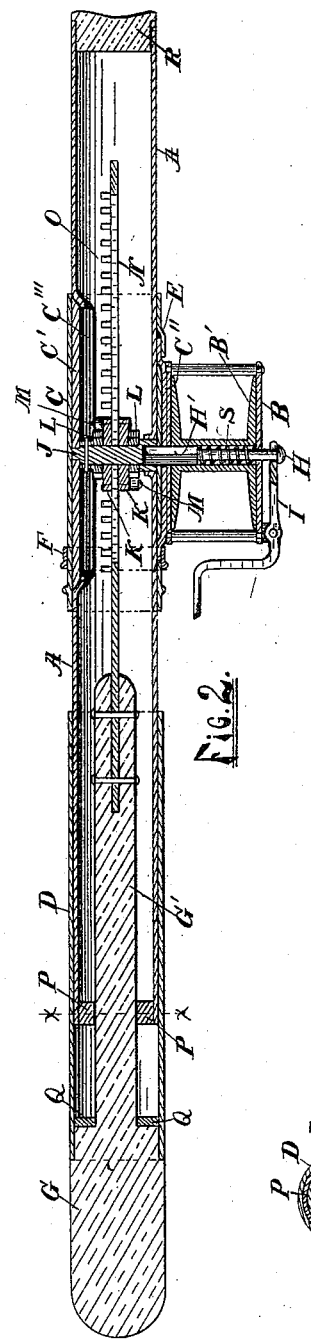
Figure 3:
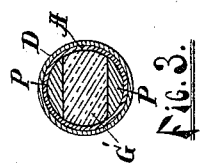
Figure 5:
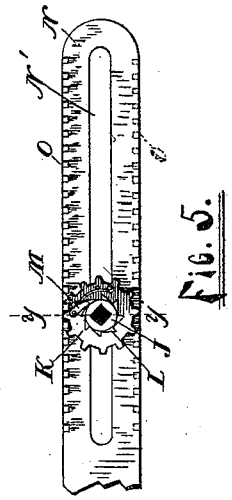
Figure 4:
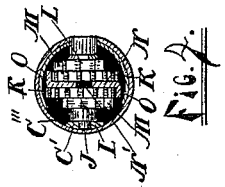

Figure 1 represents a side elevation of my improved combined pole and reel; Fig 2, a section on the line $z\ z$ of Fig. 1; Fig. 3, a transverse section on the line $x\ x$ of Fig. 2; Fig. 4, a transverse section on the line $y\ y$ of Fig. 5; Fig. 5, a detail of the driving shaft with the mechanism attached.

Like letters indicate like parts throughout the drawings.

A represents the body of the device, to which all the parts are attached, and which consists of a section of tubing which forms a portion of the lower or end section of the rod, and the upper end incloses the lower end of the next section or rod proper R.

D represents another section of tubing, which telescopes upon the lower end of A, and has the lower end fitted with a butt G, having a flattened projecting integral tenon G', to which is secured the driving-shaft N, which consists of a flat strip of suitable metal having transverse oppositely-projecting teeth O upon both edges for engaging the pinions K and a central longitudinal slot N', through which the shaft J passes.

C is another short section of tubing, which slips over A for closing the opening in the back of A at that point and for strengthening the device, and to which the reel is attached by means of the socket E and sliding band F. In the back of A is cut a slot forming an opening C''' of sufficient size to allow the wheels to be inserted into the tube through said opening, and through which such mechanism may be introduced and removed. This opening is partially closed by a longitudinally-arranged removable bar C', which forms the bearing for the end of the driving-shaft J. (See Figs. 2 and 4.)

The shaft J is arranged across the interior of A, one end of which is provided with a squared socket (shown in Fig. 5) to receive the squared end H' of the reel-shaft H. The end provided with the socket is journaled in suitable bearings in the side of tube A. On this shaft are arranged loose gears or pinions K K, having teeth engaging the teeth O O of the driving-shaft N; and also on this shaft are secured the ratchets L L, provided with spring-pawls M M, pivoted to the sides of the pinions K K, respectively.

B is the reel-case, and B' the reel, which consists of a spool with an opening through its axis, in which is placed the reel-shaft H, which is longitudinally movable therein. The lower portion of the opening is squared to correspond with the squared lower portion H' of the shaft. The upper portion is cylindrical and contains the spring S for operating the shaft.

I is a trip-lever pivoted to the reel-case and engaging the end of shaft H, by which it may be withdrawn from engagement with the shaft J.

P P are segments attached to A, engaging the flat sides of G', to prevent A and G from turning relatively, and Q Q are buffers of rubber or other elastic material for engaging the lower end of A when the parts come together.

Having thus described my invention, its operation is as follows: D telescopes and moves freely upon the lower portion of A. Hence it will be seen that with one hand of the operator grasping A above the reel a reciprocating movement may be imparted to the toothed shaft N by grasping the surface of D with the other and moving it backward and forward—in other words, lengthening and shortening the butt-section telescopically. The teeth O upon one edge of N engage one of the loose gears K and move forward one of the dogs M, which engages one of the ratchets L and causes J to revolve in a direction for winding the line upon the spool, during which movement the opposite gear K will also be engaged, but the pawl will slip over the ratchet without engagement, whereas on the opposite movement of the shaft N the opposite pawl will engage upon that side and continue the rotary motion in the same direction while the first-mentioned pawl will slip. In this way a rapid continuous rotary motion may be imparted to the reel by the simple reciprocation of the hand of the operator, as will be readily appreciated, thereby forming a very efficient device for operating the reel with the desired facility. Now in order to disengage the reel-shaft with the shaft J, so as to allow the reel to run free to let the line run out, it is only necessary to press the lever I with the finger, which draws the shaft H' backward, disengaging the part H' from its socket. The spool then revolves freely upon H, thereby letting the line run out, as will be readily comprehended.

I claim—

1. The combination of a fish-pole having its lower portion composed of two tubular sections, the lower telescoping and movable reciprocally upon the upper, a reel attached to the upper stationary section having a shaft communicating with the interior thereof, and mechanism inclosed within said stationary section for rotating said reel-shaft and connected to the movable section, whereby the reel-shaft may be rotated by the reciprocatory movement of the lower section, substantially as set forth.

2. The combination of a fish-pole having its lower portion composed of two tubular sections, the lower telescoping and movable reciprocally upon the upper, a reel attached to the upper or stationary section having a shaft communicating with the interior thereof, a transverse shaft journaled in said stationary section carrying gears and engaging the reel-shaft, and a toothed bar-shaft engaging said gears attached to said movable section, whereby the reel-shaft may be rotated by the reciprocatory movement of the lower section, substantially as set forth.

3. The combination, with a pole provided with a transversely-arranged rotating shaft J, of a reel having a spool B, and a shaft engaging the spool H longitudinally movable in its bearings and engaging the shaft J, substantially as and for the purposes set forth.

4. The combination, with a pole having a tubular lower portion A and a shaft J, journaled in A, as set forth, and provided with mechanism for rotating said shaft, of a reel attached to A, having a spool B, and a shaft H, engaging with shaft J, a spring S, and lever I, arranged substantially as described, and for the purposes herein set forth.

5. In a fish-pole having a lower portion consisting of tubular sections telescoping each other, a reel-case secured to one of said sections having a spool arranged to revolve therein, provided with a longitudinally-movable shaft through the axis thereof, the end whereof projects into said tubular section, mechanism for rotating said reel-shaft arranged within said tubular section and engaging said reel-shaft and connected to the other section, whereby said reel-shaft may be rotated by reciprocating said last-mentioned section, and a pivoted lever engaging the end of said reel-shaft for moving the same longitudinally to disconnect it from the rotating mechanism, substantially as set forth.

6. The combination, in a fish-pole, of tubular section A, and telescopic section D, rack-bar N, attached to section D, and the transverse shaft J and its ratchets and loose gears engaging the shaft N for rotating the shaft J by a reciprocating movement of section D, substantially as set forth.

7. In a fish-pole having a lower portion consisting of two tubular sections telescoping each other and forming the handle of the pole, the upper section provided with an opening at the back for inserting rotating mechanism therein, a removable bar C' in the opening, a section C open at both ends and encompassing the upper section, as set forth, a transverse shaft J, having one end journaled in the bar C' and the opposite end journaled in suitable bearings at the opposite side of section A, a reel-case detachably secured to the section C, a spool mounted to revolve in said reel-case having a longitudinally-movable shaft H in line and engaging the shaft J, and a means of rotating the shaft J, substantially as set forth.

8. The herein-described combined fishing rod and reel, consisting of a rod having a stationary tubular lower portion, a reel secured thereto, mechanism arranged in said stationary section or portion connected to said reel for rotating the same, a means of disconnecting the reel from the rotating mechanism for letting the line run out, a portion or section telescoping said stationary portion and connected to said rotating mechanism for operating the same, whereby the reel may be rotated by moving said telescopic portion for winding up the line, substantially as set forth.

In testimony whereof I affix my signature in presence of two witnesses.

CHARLES B. CORBIN.

Witnesses:
DENNIS L. ROGERS,
LUTHER V. MOULTON.